Feb. 14, 1956 H. TIMPNER 2,734,403
WORK SET-UP DEVICE
Filed June 4, 1952
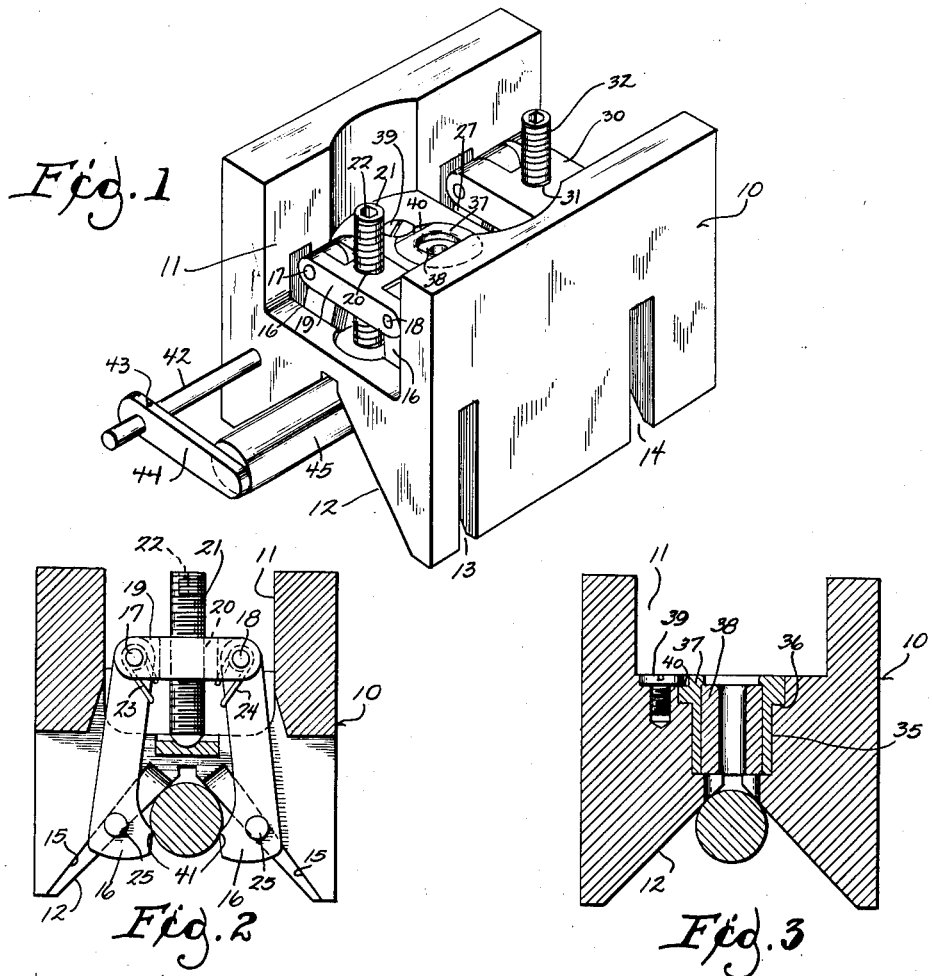
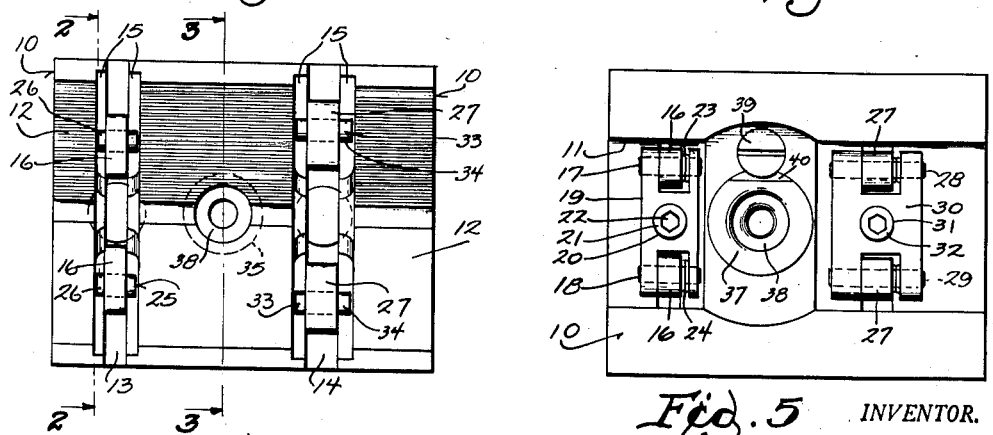
INVENTOR.
HENRY TIMPNER
BY
Gerald P Welch
ATTORNEY

United States Patent Office 2,734,403
Patented Feb. 14, 1956

2,734,403

WORK SET-UP DEVICE

Henry Timpner, Milwaukee, Wis.

Application June 4, 1952, Serial No. 291,747

2 Claims. (Cl. 77—62)

This invention relates to improvements in work set-up devices for drill presses or other machines, and more particularly to a novel V-block work set-up device.

An object of the invention is to provide a device of the type which will have adjustable means for rigidly setting up work which is round in cross-section.

Another object of the invention is to provide a device of the type which will have plural adjustable securing means for the work thus accommodating an extended scale of sizes.

Other and further objects of the invention will appear as the description proceeds, reference being had to the accompanying drawings, in which:

Fig. 1 is a view in perspective of a work set-up device embodying the invention.

Fig. 2 is a vertical sectional view thereof.

Fig. 3 is a vertical sectional view thereof taken axially of the bushing.

Fig. 4 is an inverted plan view of the device.

Fig. 5 is a plan view thereof.

Referring more particularly to the drawings, the numeral 10 refers to the device generally illustrated and having a rectangular recess in the top surface at 11 thereof and a substantially 90° V recess in the lower portion at 12 extending longitudinally thereof.

The block 10 has a pair of vertical slots as at 13 and a pair of relatively wider vertical slots as at 14, and each pair of slots has the marginal ledges 15 opposed at an angle of 70 degrees. The slots 13 accommodate a pair of arms 16 free to move therein and pivoted at 17 and 18 of a cross-head 19 threadingly apertured at 20 and meshed on the screw 21 provided with an Allen head at 22 thereof. A pair of springs 23 and 24 normally urge the arms 16 outwardly. Each arm 16 has a pin 25 held transversely therethrough and bearing with its projecting ends 26 on the marginal ledges 15.

The slots 14 accommodate for free movement therein a relatively wider pair of arms 27 pivoted at 28 and 29 of a cross-head 30 threadingly apertured at 31 and meshed on the threaded means 32. Each arm 27 has a pin 33 held transversely therethrough and riding with its projecting ends 34 on the marginal ledges 15.

Centrally of the device 10, an aperture at 35 is provided with a shoulder 36 to retain a bushing 37 with its bushing insert 38. A retaining screw 39 is turned down against a ledge 40 on the bushing 37 to fix the latter.

The arms 16 and 27 are each provided with inwardly projecting jaws as at 41 to engage and retain an article of work which is round or otherwise appropriately shaped in cross-section.

An arm 42 has adjustable thereon by threaded means 43, the stop 44.

In use, a round article of work 45 may be engaged between the jaws 41 of the arms 16 by loosening and then tightening the screw 21. The properly sized bushing insert 38 is then inserted and the block 10 is positioned appropriately under the drill press.

The pins 25 and 33 support the jaws 41 in a manner whereby actuation of the same into engagement with a workpiece 45 effects a wedging action of each jaw between the workpiece and the angular ledges 15 on which the pins therefor slide.

By constructing the ledges 15 at a smaller angle than that of the V-crotch supporting the workpiece the jaws are positioned to engage different sized cylindrical workpieces always near to and on the approach side of the transverse central plane of the workpiece. In effect the edges of the slots 13 and 14 are recessed to form grooves of tapered depth that provide the shoulders 15 for supporting the corresponding pins 25 and 33.

In operation the cross heads 19 and 30 are actuated by the corresponding screws 21 and 32 in a direction generally parallel to a geometric line bisecting the V-crotch of the block.

It will be understood that the device is capable of many modifications in structure and design, without departing from the spirit of the invention, within the scope of the appended claims.

Having thus described the invention, what is claimed and desired to be secured by Letters Patent of the United States, is:

1. A work set-up device comprising a V-block adapted to receive a workpiece in the crotch thereof, a pair of jaws disposed in corresponding slots on opposite sides of the crotch and adapted to engage opposite sides of the workpiece to clamp the same in said crotch, a supporting arm for each jaw extending on the corresponding side of the workpiece in the crotch and in a direction generally parallel to a geometric line bisecting the crotch, a cross-head pivoted at its opposite ends to the corresponding arms of the jaws at the bottom of the crotch, means to move said cross-head in a direction generally parallel to said geometric line, the walls of said crotch adjacent said slots being recessed to provide a groove of tapered depth with the greater depth thereof at the apex of the crotch, and pins on the opposite sides of each jaw disposed to ride in the corresponding tapered grooves and to support the jaws for clamping purposes whereby when said cross-head is moved to effect clamping of a workpiece the jaws move inwardly toward each other and toward the apex of the crotch to engage the workpiece, the tapered depth of the grooves receiving the supporting pins for the jaws compensating for different diameter workpieces to locate the point of engagement of each jaw with the workpiece near to and on the approach side of the transverse centerplane of the workpiece.

2. A work set-up device comprising a V-block adapted to receive a workpiece in the crotch thereof, a pair of jaws disposed in corresponding slots on opposite sides of the crotch and adapted to engage opposite sides of the workpiece to clamp the same in said crotch, a vertical bore through the base of said V-block having its axis bisecting the crotch, and a bushing in said bore to serve as a guide for a drill in drilling a workpiece clamped by said jaws, said bore and bushing being spaced from said slots longitudinally of the crotch, a supporting arm for each jaw extending on the corresponding side of the workpiece in the crotch and in a direction generally parallel to a geometric line bisecting the crotch, a cross-head pivoted at its opposite ends to the corresponding arms of the jaws at the bottom of the crotch, means to move said cross-head in a direction generally parallel to said geometric line, the walls of said crotch adjacent said slots being recessed to provide a groove of tapered depth with the greater depth thereof at the apex of the crotch, and pins on the opposite sides of each jaw disposed to ride in the corresponding tapered grooves and to support the jaws for clamping purposes whereby when said cross-head is moved to effect clamping of a workpiece the jaws move inwardly toward each other and toward the apex of the crotch to engage the workpiece, the tapered depth of the grooves receiving the supporting pins for the jaws compensating for different diameter workpieces to locate the point of engagement of each jaw with the workpiece near to and on the approach side of the transverse centerplane of the workpiece.

References Cited in the file of this patent

UNITED STATES PATENTS

| | | |
|---|---|---|
| 361,777 | Patten | Apr. 26, 1887 |
| 550,767 | Thielscher | Dec. 3, 1895 |
| 762,070 | Longard | June 7, 1904 |

FOREIGN PATENTS

| | | |
|---|---|---|
| 546,926 | Great Britain | Aug. 5, 1942 |